United States Patent
Chai

(10) Patent No.: US 11,594,893 B2
(45) Date of Patent: *Feb. 28, 2023

(54) CHARGING METHOD, APPARATUS, AND SYSTEM

(71) Applicant: HUAWEI TECHNOLOGIES CO., LTD., Guangdong (CN)

(72) Inventor: Xiaoqian Chai, Dongguan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 57 days.

This patent is subject to a terminal disclaimer.

(21) Appl. No.: 17/124,293

(22) Filed: Dec. 16, 2020

(65) Prior Publication Data

US 2021/0104899 A1   Apr. 8, 2021

Related U.S. Application Data

(63) Continuation of application No. 16/851,665, filed on Apr. 17, 2020, now Pat. No. 10,944,272, which is a
(Continued)

(30) Foreign Application Priority Data

Apr. 28, 2018   (CN) .......................... 201810401785.1

(51) Int. Cl.
  *H04M 11/00*   (2006.01)
  *H02J 7/00*   (2006.01)
  (Continued)

(52) U.S. Cl.
  CPC ........ *H02J 7/00036* (2020.01); *H02J 7/0047* (2013.01); *H04L 41/0806* (2013.01); *H04L 63/0876* (2013.01); *H04L 67/146* (2013.01)

(58) Field of Classification Search
  CPC ............. H04L 41/0806; H04L 63/0876; H04L 67/146
  (Continued)

(56) References Cited

U.S. PATENT DOCUMENTS 8,856,860 B2   10/2014   Grayson et al.
9,215,336 B2   12/2015   Chai et al.
(Continued)

FOREIGN PATENT DOCUMENTS

CN   1996860 A   7/2007
CN   101150863 A   3/2008
(Continued)

OTHER PUBLICATIONS

3GPP TS 23.501 V15.1.0 (Mar. 2018), "3rd Generation Partnership Project;Technical Specification Group Services and System Aspects;System Architecture for the 5G System;Stage 2(Release 15)," Mar. 2018, 201 pages.
(Continued)

*Primary Examiner* — Marceau Milord
(74) *Attorney, Agent, or Firm* — Fish & Richardson P.C.

(57) ABSTRACT

Embodiments of this application disclose a charging method and related devices. An example charging method includes: sending a charging start request for a packet data unit (PDU) session to a charging function apparatus, where the charging start request carries an indication receiving address; receiving an indication message that is sent by the charging function apparatus based on the indication receiving address, where the indication message carries an indication type; and performing charging processing based on the indication type.

24 Claims, 5 Drawing Sheets

Related U.S. Application Data continuation of application No. PCT/CN2019/075783, filed on Feb. 22, 2019.

(51) Int. Cl.
  *H04L 41/0806* (2022.01)
  *H04L 9/40* (2022.01)
  *H04L 67/146* (2022.01)

(58) Field of Classification Search
  USPC .......................................................... 455/406
  See application file for complete search history.

(56) References Cited

U.S. PATENT DOCUMENTS

| | | |
|---|---|---|
| 9,479,917 B1 | 10/2016 | Gota et al. |
| 9,531,554 B1 | 12/2016 | Velusamy et al. |
| 10,205,831 B1 | 2/2019 | Yan et al. |
| 10,205,832 B2 | 2/2019 | Chai |
| 10,674,330 B2 | 6/2020 | Chai |
| 10,715,680 B2 | 7/2020 | Chai |
| 10,944,272 B2* | 3/2021 | Chai ................... H04M 15/00 |
| 2009/0264096 A1 | 10/2009 | Cai et al. |
| 2009/0264097 A1 | 10/2009 | Cai et al. |
| 2011/0067085 A1 | 3/2011 | Brouard et al. |
| 2011/0151819 A1 | 6/2011 | Dickey et al. |
| 2012/0184244 A1* | 7/2012 | Cai ..................... H04M 15/57 455/408 |
| 2013/0084881 A1 | 4/2013 | Tang |
| 2015/0156334 A1 | 6/2015 | Chai |
| 2016/0105567 A1 | 4/2016 | Dahl et al. |
| 2016/0198049 A1 | 7/2016 | Iwai |
| 2017/0359749 A1 | 12/2017 | Dao |
| 2018/0069798 A1 | 3/2018 | Bacik et al. |
| 2019/0053104 A1* | 2/2019 | Qiao ..................... H04L 47/20 |
| 2019/0053147 A1* | 2/2019 | Qiao ................. H04M 15/8038 |
| 2019/0116521 A1* | 4/2019 | Qiao ..................... H04L 69/04 |
| 2019/0150081 A1 | 5/2019 | Qiao et al. |
| 2019/0166258 A1 | 5/2019 | Yan et al. |
| 2019/0182875 A1* | 6/2019 | Talebi Fard ............ H04W 8/18 |
| 2019/0207778 A1* | 7/2019 | Qiao ..................... H04W 4/24 |
| 2019/0254118 A1* | 8/2019 | Dao ..................... H04L 67/141 |
| 2020/0053165 A1* | 2/2020 | Li ......................... H04W 76/12 |
| 2020/0100075 A1 | 3/2020 | Chai |
| 2020/0204685 A1 | 6/2020 | Chai |
| 2020/0213821 A1* | 7/2020 | Shi ........................ H04W 28/02 |
| 2020/0305224 A1* | 9/2020 | Chong ................... H04W 60/00 |
| 2021/0014765 A1* | 1/2021 | Shan ..................... H04W 36/14 |
| 2021/0022063 A1* | 1/2021 | Yang ..................... H04W 40/02 |

FOREIGN PATENT DOCUMENTS

| | | |
|---|---|---|
| CN | 101582777 A | 11/2009 |
| CN | 102238507 A | 11/2011 |
| CN | 102612011 A | 7/2012 |
| CN | 104144083 A | 11/2014 |
| CN | 107969169 | 4/2018 |
| JP | 2007529171 A | 10/2007 |
| JP | 2015526041 A | 9/2015 |
| JP | 2017514338 A | 6/2017 |
| WO | 2018025091 A1 | 2/2018 |

OTHER PUBLICATIONS

3GPP TS 23.502 V15.1.0 (Mar. 2018), "3rd Generation Partnership Project; Technical Specification Group Services and System Aspects; Procedures for the 5G System; Stage 2 (Release 15)," Mar. 2018, 285 pages.

3GPP TS 32.240 V15.1.0 (Mar. 2018), "3rd Generation Partnership Project; Technical Specification Group Services and System Aspects; Telecommunication management; Charging management; Charging architecture and principles (Release 15)," Mar. 2018, 58 pages.

Office Action issued in Japanese Application No. 2021-503189 dated Dec. 7, 2021, 9 pages (with English translation).

3GPP TS 32.290 V0.1.0 (Feb. 2018), 3rd Generation Partnership Project, Technical Specification Group Services and System Aspects, Telecommunication management, Charging management, 5G system, Services, operations and procedures of charging using Service Based Interface (SBI) (Release 15), 11 pages.

3GPP TS 32.291 V0.1.0 (Feb. 2018) ,3rd Generation Partnership Project, Technical Specification Group Services and System Aspects, Telecommunication management, Charging management, 5G system, Charging service, stage 3 Release 15), 9 pages.

Office Action issued in Chinese Application No. 201911205402.4 dated Jul. 29, 2020, 16 pages (with English translation).

PCT International Search Report and Written Opinion in International Application No. PCT/CN2019/075,783, dated May 5, 2019, 12 pages (With Partial English Translation).

* cited by examiner

CHARGING METHOD, APPARATUS, AND SYSTEM

CROSS-REFERENCE TO RELATED APPLICATIONS

This application is a continuation of U.S. patent application Ser. No. 16/851,665, filed on Apr. 17, 2020, which is a continuation of International Application No. PCT/CN2019/075783, Feb. 22, 2019. The International Application claims priority to Chinese Patent Application 201810401785.1, filed on Apr. 28, 2018. All of the afore-mentioned patent applications are hereby incorporated by reference in their entireties.

TECHNICAL FIELD

This application relates to the field of communications technologies, and in particular, to a charging method, apparatus, and system.

BACKGROUND

Currently, in a 4G communications system, an online charging service and an offline charging service are respectively charged by using different charging systems. As shown in FIG. 1, a charging trigger function apparatus in the communications system communicates with an online charging system by using a Ro interface, and communicates with an offline charging system by using an Rf interface. The online charging system is used to charge for the online charging service, and the offline charging system is used to charge for the offline charging service.

For example, in a 4G Diameter-based online charging session, a charging session exists between the charging trigger function apparatus and the online charging system. During the charging session, the charging trigger function apparatus requests the online charging system to perform charging processing, and the online charging system performs corresponding charging processing based on a request response.

However, in a charging processing process, especially during service-based charging, sometimes the online charging system needs to actively perform some charging processing. However, if the charging trigger function apparatus does not actively request the online charging system to perform the charging processing, the online charging system cannot perform the charging processing. Consequently, a charging processing method in a current charging system is insufficiently flexible.

SUMMARY

Embodiments of this application provide a service-based charging method, apparatus, and system, so that a charging function apparatus enables, as required, a charging trigger function apparatus to perform some specific operations, to meet a plurality of different charging requirements, and make charging processing more flexible and convenient.

According to a first aspect, an embodiment of this application provides a charging method, including: sending, by a charging trigger function apparatus, a charging start request for a packet data unit (PDU) session to a charging function apparatus, where the charging start request carries an indication receiving address, and the indication receiving address is associated with the PDU session, so that the charging function apparatus can send, by using the indication receiving address, an indication message to the PDU session in the charging trigger function apparatus corresponding to the indication receiving address; receiving, by the charging trigger function apparatus, the indication message that is sent by the charging function apparatus based on the indication receiving address, where the indication message carries an indication type; and performing charging processing based on the indication type.

It should be understood that the indication type herein may include the following several types: a charging update indication, a charging terminating indication, a charging function apparatus overload indication, a charging rule configuration indication, and a charging resource validity detecting indication. The indication message may include one or more of the indication types.

In this embodiment of the present invention, because the charging trigger function apparatus adds the indication receiving address to the charging start request, the charging function apparatus may send, by using the indication receiving address, the indication message to the charging trigger function apparatus corresponding to the indication receiving address. In this way, the charging trigger function apparatus may receive the indication message carrying the indication type. Because there are a plurality of indication types, the charging trigger function apparatus performs corresponding charging processing based on the different indication types. In this way, the charging function apparatus enables, as required, the charging trigger function apparatus to perform some specific operations, to meet a plurality of different charging requirements. In addition, this embodiment of the present invention may be applied to a 5G scenario, so that in a service-based interface mechanism, the charging function apparatus may be considered as a server, and the charging trigger function apparatus may be considered as a client. In this way, a server side can have a capability of enabling a client side to perform some specific operations, thereby meeting a personalized charging requirement and making charging processing more flexible and convenient.

First manner: When the indication type is specifically a charging update indication, the performing, by the charging trigger function apparatus, charging processing based on the indication type is specifically: sending, by the charging trigger function apparatus, a charging update request to the charging function apparatus based on the indication type of the charging update indication. The charging update request carries to-be-updated charging information (the charging information may be specifically statistics about data flows, for example, 5 MB traffic is used for a rate group 1). If the indication message further carries an indication applicable scope, the charging trigger function apparatus sends the charging update request to the charging function apparatus for corresponding charging information within the applicable scope. In this case, the to-be-updated charging information is specifically the corresponding charging information within the applicable scope; or if the indication message does not carry an indication applicable scope, the charging trigger function apparatus sends the charging update request to the charging function apparatus for all charging information of the PDU session. In this case, the to-be-updated charging information is specifically all the charging information of the PDU session. The charging trigger function apparatus may trigger, by using the indication type of the charging update indication, the charging function apparatus to update charging. In addition, the indication message may carry the indication applicable scope, and the charging trigger function apparatus may report charging information for different scopes, to update charging information. It should be understood that there are different applicable scopes, for example, all data flows on which online charging is performed in the PDU session, all data flows on which offline charging is performed in the PDU session, or all data flows on which charging is performed in the PDU session. The applicable scope may further be limited to data flows that correspond to one or more rating groups in the data flows on which online charging is performed, or data flows that correspond to one or more rating groups in the data flows on which offline charging is performed, or data flows that correspond to one or more rating groups and one or more service flow identifiers corresponding to the one or more rating groups in the data flows on which online charging is performed, or data flows that correspond to one or more rating groups and one or more service flow identifiers corresponding to the one or more rating groups in the data flows on which offline charging is performed. If the indication message does not carry any applicable scope, it is considered by default that the indication message is applicable to all the data flows on which charging is performed in the PDU session. The data flow herein may be data traffic generated when a user accesses a data service.

It should be understood that the charging update request may be a charging addition request. In this case, to-be-updated charging information carried in the charging addition request may be specifically to-be-added charging information. The charging update request may be a charging replacement request. In this case, to-be-updated charging information carried in the charging replacement request may be specifically to-be-replaced charging information.

Second manner: When the indication type is specifically a charging terminating indication, the performing, by the charging trigger function apparatus, charging processing based on the indication type is specifically: sending, by the charging trigger function apparatus, a first charging terminating request to the charging function apparatus based on the indication type of the charging terminating indication, to terminate charging for the PDU session. The charging trigger function apparatus may trigger, by using the indication type of the charging terminating indication, the charging function apparatus to terminate charging for the PDU session.

It should be understood that the first charging terminating request is specifically a POST message or a PUT message. In this case, the POST message or the PUT message carries an attribute of the charging terminating indication and all current charging information of the PDU session. Alternatively, the first charging terminating request is specifically a DELETE message, and before the sending a first charging terminating request to the charging function apparatus, the method further includes: sending, by the charging trigger function apparatus, a charging update request to the charging function apparatus, where the charging update request carries all current charging information of the PDU session. The first charging terminating request may be sent to the charging function apparatus in different message formats, so that implementation solutions become diversified and flexible.

Third manner: When the indication type is specifically a charging function apparatus overload indication, the performing, by the charging trigger function apparatus, charging processing based on the indication type is specifically: the indication message further carries an overload degree of the charging function apparatus, and before a next indication message whose indication type is a charging function apparatus overload indication is received or before a validity period carried in the indication message expires, adjusting, based on the overload degree, a quantity of requests sent to the charging function apparatus (the request herein is a request that is related to charging and that is sent by the charging trigger function apparatus to the charging function apparatus, for example, the charging start request, the first charging terminating request, or the charging update request). The charging trigger function apparatus may dynamically adjust, based on the overload degree of the charging function apparatus, the quantity of requests sent to the charging function apparatus, to adjust load of the charging function apparatus.

Fourth manner: When the indication type is specifically a charging rule configuration indication, the indication message may further carry a charging rule, and the performing, by the charging trigger function apparatus, charging processing based on the indication type is specifically: configuring, by the charging trigger function apparatus, the charging rule based on the indication type of the charging rule configuration indication. There may be a plurality of charging rules, for example, a candidate server address rule, an offline reporting interval rule, an entire idle resource threshold rule, an online or offline reporting condition rule, and a rule of using online charging or offline charging for a rating group. The charging trigger function apparatus may store or configure the received charging rule.

Fifth manner: When the indication type is specifically a charging resource validity detecting indication, the performing, by the charging trigger function apparatus, charging processing based on the indication type is specifically: if determining, based on a PDU session identifier carried in the indication message, that a charging resource of the PDU session corresponding to the PDU session identifier exists in the charging trigger function apparatus, sending a response success message to the charging function apparatus; or if determining that a charging resource of the PDU session corresponding to the PDU session identifier does not exist in the charging trigger function apparatus, sending a response failure message to the charging function apparatus. The charging trigger function apparatus may notify, by sending different response messages, the charging function apparatus whether there is a valid charging resource.

It should be understood that the charging start request may further carry the indication type supported by the charging trigger function apparatus and an attribute of activating the charging function apparatus to deliver an indication by using the indication receiving address. When the charging trigger function apparatus does not need the charging function apparatus to deliver the indication message, the charging trigger function apparatus may generate a second charging terminating request, and send the second charging terminating request to the charging function apparatus. The charging function apparatus is triggered to stop delivering the indication message related to the current PDU session to the charging function apparatus, based on an attribute that is carried in the second charging terminating request and that is of disabling the charging function apparatus from sending an indication by using the indication receiving address.

According to a second aspect, an embodiment of this application provides a charging method, including: receiving, by a charging function apparatus, a charging start request sent by a charging trigger function apparatus, where the charging start request carries an indication receiving address; and sending an indication message to the charging trigger function apparatus based on the indication receiving address when the charging function apparatus determines that an indication needs to be sent to the charging trigger function apparatus, where the indication message carries an indication type.

It should be understood that the indication type herein may include the following several types: a charging update indication, a charging terminating indication, a charging function apparatus overload indication, a charging rule configuration indication, and a charging resource validity detecting indication. The indication message may carry one or more of the indication types.

After receiving the charging start request, when needing to send an indication to the charging trigger function apparatus, the charging function apparatus triggers sending of an indication message to the charging trigger function apparatus. The charging function apparatus sends, based on different conditions, indication messages including different indication types to the charging trigger function apparatus, so that the charging trigger function apparatus performs corresponding charging processing. In this way, the charging function apparatus enables, as required, the charging trigger function apparatus to perform some specific operations, to meet different charging requirements.

It should be understood that, in different cases, indication messages sent by the charging function apparatus to the charging trigger function apparatus are also different. For example, when a re-authorization condition is met (for example, re-authorization is required due to a change in a user account balance, re-authorization is required due to a change in user subscription information, or re-authorization is required due to a change in a user consumption accumulator), an indication message is sent to the charging trigger function apparatus, and the indication message carries an indication type of a charging update indication and an indication applicable scope; when a charging terminating condition is met (for example, a user account balance is lower than a specified threshold or a credit is used up), an indication message is sent to the charging trigger function apparatus, and the indication message carries an indication type of a charging terminating indication; when the charging function apparatus is overloaded, an indication message is sent to the charging trigger function apparatus, and the indication message carries an indication type of a charging function apparatus overload indication and an overload degree of the charging function apparatus; when a charging rule configuration condition is met (for example, a charging rule needs to be reconfigured due to a change in configuration information in a charging system, or a charging rule needs to be reconfigured due to a change in content subscribed by a user), an indication message is sent to the charging trigger function apparatus, and the indication message carries an indication type of a charging rule configuration indication and a to-be-configured charging rule; or when the charging function apparatus clears an invalid charging resource, an indication message is sent to the charging trigger function apparatus, and the indication message carries an indication type of a charging resource validity detecting indication. The charging function apparatus sends, based on different conditions, indication messages including different indication types to the charging trigger function apparatus, so that the charging trigger function apparatus performs corresponding charging processing. In this way, the charging function apparatus enables, as required, the charging trigger function apparatus to perform some specific operations, so that service-based charging can be implemented, and charging processing is more flexible.

It should be understood that the method further includes: receiving a charging update request sent by the charging trigger function apparatus, where the charging update request carries to-be-updated charging information; and updating stored charging information with the to-be-updated charging information based on the to-be-updated charging information.

It should be understood that the method further includes: receiving a first charging terminating request sent by the charging trigger function apparatus, to terminate charging for the PDU session. For example, when the first charging terminating request is specifically a POST message or a PUT message, and the POST message or the PUT message carries an attribute of the charging terminating indication and all current charging information of the PDU session, charging information of the PDU session is updated based on all the current charging information of the PDU session; and charging for the PDU session is terminated based on the attribute of the charging terminating indication. For another example, when the first charging terminating request is specifically a DELETE message, before the DELETE message is received, the charging update request sent by the charging trigger function apparatus is received, where the charging update request carries all current charging information of the PDU session; charging information of the PDU session is updated; and charging for the PDU session is terminated based on the DELETE message.

It should be understood that after the receiving a charging start request sent by a charging trigger function apparatus, the charging function apparatus further stores the indication receiving address.

It should be understood that, the method further includes: receiving, by the charging function apparatus, a second charging terminating request sent by the charging trigger function apparatus, where the second charging terminating request carries an attribute of disabling the charging function apparatus from sending an indication by using the indication receiving address; and deleting the stored indication receiving address based on the attribute of disabling the charging function apparatus from sending an indication by using the indication receiving address.

It should be understood that the method further includes: receiving, by the charging function apparatus, a response failure message sent by the charging trigger function apparatus, where the response failure message includes a PDU session ID; determining, based on the PDU session ID, that a charging resource of the PDU session does not exist, so that the nonexistent charging resource related to the PDU session may be cleared from the CTF apparatus.

According to a third aspect, an embodiment of this application provides a charging trigger function apparatus, including several functional units configured to implement any method according to the first aspect. For example, the charging trigger function apparatus may include:

a sending unit, configured to send a charging start request for a packet data unit (PDU) session to a charging function apparatus, where the charging start request carries an indication receiving address;

a receiving unit, configured to receive an indication message that is sent by the charging function apparatus based on the indication receiving address, where the indication message carries an indication type; and a processing unit, configured to perform charging processing based on the indication type.

According to a fourth aspect, an embodiment of this application provides a charging function apparatus, including several functional units configured to implement any method according to the second aspect. For example, the charging function apparatus may include:

a receiving module, configured to receive a charging start request sent by a charging trigger function apparatus, where the charging start request carries an indication receiving address; and a sending module, configured to send an indication message to the charging trigger function apparatus based on the indication receiving address when it is determined that an indication needs to be sent to the charging trigger function apparatus, where the indication message carries an indication type.

According to a fifth aspect, an embodiment of this application provides a charging trigger function apparatus, including a nonvolatile memory and a processor that are coupled to each other, where the processor invokes program code stored in the memory to perform some or all steps of any method according to the first aspect.

According to a sixth aspect, an embodiment of this application provides a charging function apparatus, including a nonvolatile memory and a processor that are coupled to each other, where the processor invokes program code stored in the memory to perform some or all steps of any method according to the second aspect.

According to a seventh aspect, an embodiment of this application provides a computer-readable storage medium, and the computer-readable storage medium stores program code, where the program code includes an instruction used to perform some or all steps of any method according to the first aspect.

According to an eighth aspect, an embodiment of this application provides a computer-readable storage medium, and the computer-readable storage medium stores program code, where the program code includes an instruction used to perform some or all steps of any method according to the second aspect.

According to a ninth aspect, an embodiment of this application provides a computer program product, and when the computer program product is run on a computer, the computer is enabled to perform some or all steps of any method according to the first aspect.

According to a tenth aspect, an embodiment of this application provides a computer program product, and when the computer program product is run on a computer, the computer is enabled to perform some or all steps of any method according to the first aspect.

According to an eleventh aspect, an embodiment of this application provides a charging system, including the charging trigger function apparatus according to the third aspect and the charging function apparatus according to the fourth aspect.

It should be understood that, the technical solutions in the second to the eleventh aspects of this application are consistent with the technical solution in the first aspect, and beneficial effects achieved by these aspects and corresponding feasible implementations are similar. Details are not described again.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1:
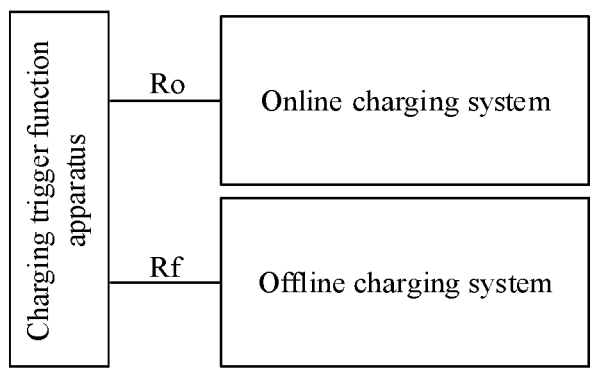
FIG. 1 is a schematic block diagram of a charging system in the prior art.
Figure 2:
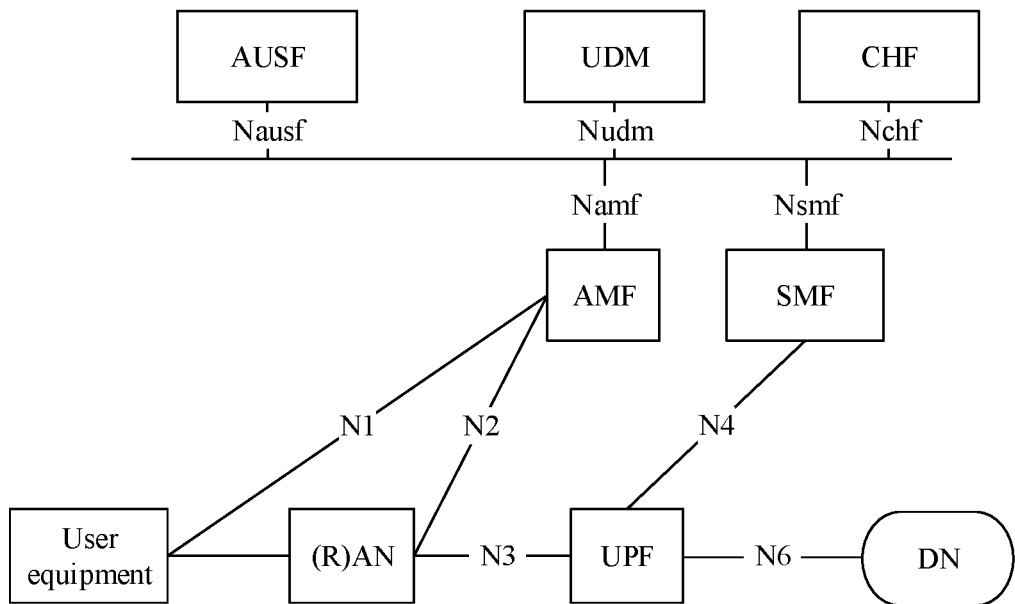
FIG. 2 is a schematic block diagram of a network architecture according to an embodiment of this application.

FIG. 2 is a schematic diagram of a possible network architecture to which an embodiment of this application is applicable. The network architecture is a 5th generation mobile communications technology (5G) network architecture. The 5G architecture may include user equipment, a radio access network (RAN), an access and mobility management function (AMF) apparatus, a session management function (SMF) apparatus, a user plane function (UPF) apparatus, a data management function (unified data management, UDM) apparatus, an authentication server function (AUSF) apparatus, and a data network (DN). In addition, in addition to the network elements shown in FIG. 2, the 5G network architecture may further include an authentication credential repository and processing function (ARPF) apparatus, a security anchor function (SEAF) apparatus, a policy control function (PCF), and the like. The functional units in FIG. 2 may establish a connection to each other by using a next generation (NG) interface to implement communication. For example, a terminal device establishes an air interface connection to a radio access network (RAN) device/access network (AN) device by using a new radio (NR) interface, to transmit user plane data and control plane signaling. The terminal device may establish a control plane signaling connection to the AMF by using an NG interface 1 (N1 for short). The RAN device, for example, a 5G radio access base station (5G NodeB, 5GNB), may establish a user plane data connection to the UPF by using an NG interface 3 (N3 for short). The RAN device may establish a control plane signaling connection to the AMF by using an NG interface 2 (N2 for short). The UPF may establish a control plane signaling connection to the SMF by using an NG interface 4 (N4 for short). The UPF may exchange user plane data with the data network by using an NG interface 6 (N6 for short). The AMF may establish a control plane signaling connection to the SMF by using a Namf interface (Namf for short). The SMF may establish a control plane signaling connection to the PCF entity by using an NG interface 7 (N7 for short).

A main function of the RAN is to control radio access of the user equipment to a mobile communications network. The RAN is a part of a mobile communications system, and implements a radio access technology. Conceptually, the RAN resides in a device (such as a mobile phone, a computer, or any remote controller), and provides a connection to a core network of the mobile communications network. The RAN device includes but is not limited to an NR (New Radio) in 5G, an evolved NodeB (eNB), a radio network controller (RNC), a NodeB (NB), a base station controller (BSC), a base transceiver station (BTS), a home base station (for example, a home evolved nodeB, or a home node B, HNB), a baseband unit (BBU), a transmission point (transmitting and receiving point, TRP), a transmitting point (TP), a mobile switching center, and the like. In addition, the RAN device may further include a wireless fidelity (Wi-Fi) access point (AP), and the like.

The AMF apparatus is responsible for access management and mobility management of the user equipment. In an actual application, the AMF apparatus includes a mobility management function of an MME in a 4G network framework, and further includes an access management function.

The SMF apparatus is responsible for session management, for example, establishment of a user session. Specifically, in a charging system and a charging method in the embodiments of the present invention, the SMF is further configured to: perform management behavior such as establishment, modification, and release of a PDU session; assign an IP address to the UE; select a user plane; configure a user-plane routing policy; interact with the PCF to obtain a control policy of the PCF; execute a control plane part of the control policy; and determine a switching mode of a PDU (packet data unit) session in a determined IP type.

The UPF apparatus is a user plane function network element, and is mainly responsible for connecting to an external network. The UPF apparatus includes related functions of an SGW and a P-GW in the 4G network architecture.

The DN is a network responsible for providing a service to the user equipment. For example, some DNs provide a network access function to the user equipment, and other DNs provide a short message service function to the user equipment.

The AUSF apparatus has an authentication service function, and is configured to terminate an authentication function requested by the SEAF.

The UDM apparatus may store subscription information of the user equipment, to implement a back end similar to an HSS in 4G.

The ARPF apparatus has an authentication credential storage and processing function, and is configured to store a long-term authentication credential of the user equipment, for example, a permanent key K. In 5G, the function of the ARPF may be integrated into the UDM apparatus.

The SEAF apparatus is configured to complete an authentication process for the user equipment. In 5G, the function of the SEAF may be integrated into the AMF apparatus.

The foregoing functional units such as the access and mobility management function, the session management function, the policy control function, and the user plane function may work independently, or may be combined together to implement some control functions. For example, the AMF, the SMF, and the PCF may be combined as a management device to implement access control and mobility management functions such as access authentication, security encryption, and location registration of the terminal device, session management functions such as establishment, release, and modification of a user plane transmission path, and functions of analyzing data (such as congestion) related to some slices and data related to the terminal device. The UPF, as a gateway device, mainly completes functions such as routing and forwarding of user plane data, for example, is responsible for data packet filtering, data transmission/forwarding, rate control, and charging information generation for the terminal device.

The user equipment is a device having wireless transmission and reception functions, and may be deployed on the land, including an indoor or outdoor device, a handheld device, or a vehicle-mounted device; or may be deployed on the water (for example, on a ship), or may be deployed in the sky (for example, on a plane, a balloon, or a satellite). Specifically, the user equipment may be user equipment (UE), a mobile phone, or a tablet computer (pad) that is accessible to a mobile network, a computer having wireless transmission and reception functions, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

Figure 3:
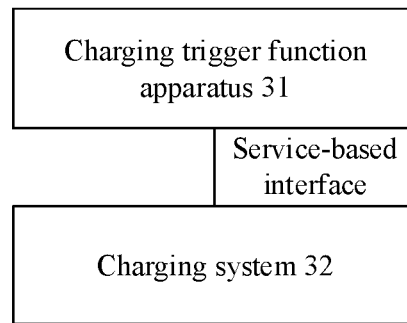
FIG. 3 is a schematic block diagram of a charging system according to an embodiment of this application.

FIG. 3 is a schematic diagram of a charging architecture according to an embodiment of this application. The charging architecture includes a charging trigger function (CTF) apparatus 31 and a charging system 32. The charging trigger function apparatus 31 and the charging system 32 may communicate with each other by using a service-based interface. The service-based interface is a resource-based capability exposure interface. The service-based interface may be a RESTful interface, a remote procedure call (RPC) interface, or the like. With reference to the network architecture in FIG. 2, the charging trigger function apparatus 31 may be disposed in an SMF apparatus. In other words, the SMF apparatus integrates a function of the CTF apparatus 31. The charging system 32 includes a charging function (CHF) apparatus. The CHF apparatus may perform online charging and offline charging. In other words, the charging system 32 may be a convergent charging system. The charging system 32 further includes an account balance management function (ABMF) apparatus and a rating function (RF) apparatus that are required for performing charging. The ABMF apparatus is configured to store and manage a user account, and the RF apparatus is configured to perform rating on usage information of a service. In addition to the charging trigger function apparatus 31 and the charging system 32 shown in FIG. 3, the charging architecture in this embodiment of the present invention may further include a billing apparatus. The billing apparatus and the charging system 32 may communicate with each other by using a charging gateway function (CGF) apparatus. The CGF apparatus may be integrated into the charging system as a part of the charging system; or may be integrated into the billing apparatus as a part of the billing apparatus; or may exist as an independent network element. Specific descriptions are further provided in the following content.

The charging trigger function apparatus 31 generates a charging start request, and the charging system 32 processes the charging start request. Therefore, the charging trigger function apparatus 31 may also be considered as a client, and the charging system 32 may also be considered as a server. Various implementation solutions of the charging trigger function apparatus 31, the charging system 32, or both the charging trigger function apparatus 31 and the charging system 32 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification.

Figure 4A:
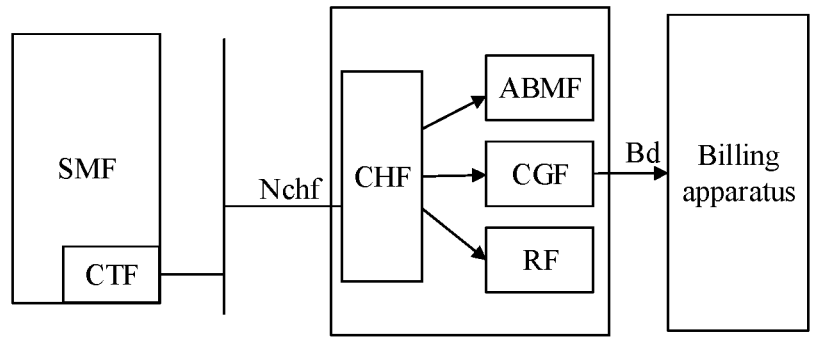
FIG. 4A is a schematic block diagram of a charging framework according to an embodiment of this application.
Figure 4B:
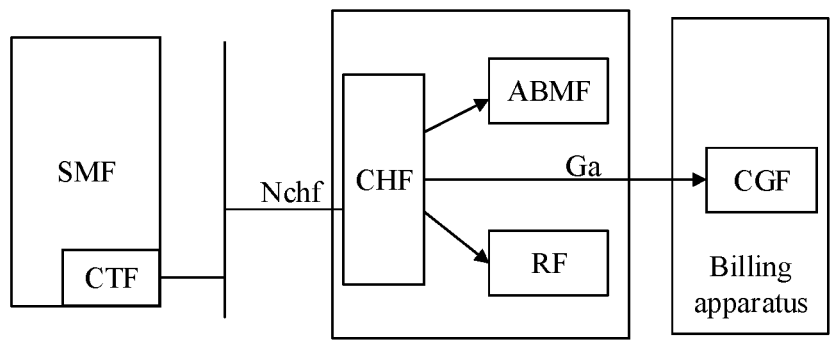
FIG. 4B is a schematic block diagram of a charging framework according to an embodiment of this application.
Figure 4C:
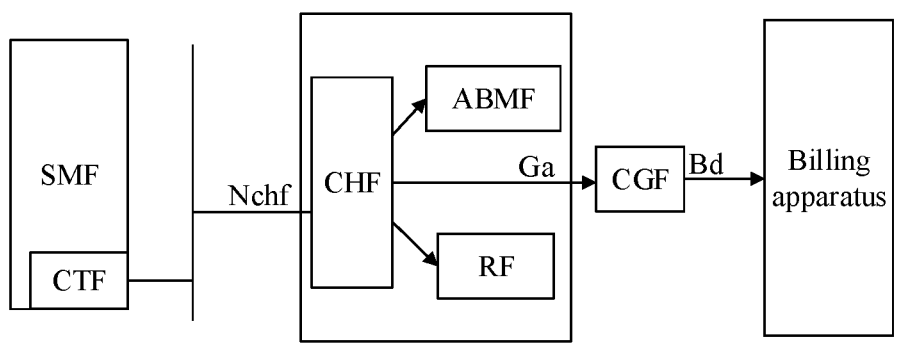
FIG. 4C is a schematic block diagram of a charging framework according to an embodiment of this application.

FIG. 4A to FIG. 4C are specific implementations of the charging architecture in FIG. 3. The CHF apparatus may provide a service to the outside by using a specific service-based interface RESTful. A name of the specific interface is Nchf. The CTF apparatus may access the CHF apparatus by using the Nchf interface. The CHF apparatus may be combined with the ABMF apparatus and the RF apparatus to form a charging system. In addition, for the charging architecture shown in FIG. 4A, the CGF apparatus is disposed in the charging system. In this case, the CGF apparatus is connected to the billing apparatus by using a Bd interface. For the charging architecture shown in FIG. 4B, the CGF apparatus is disposed in the billing apparatus. In this case, the CHF apparatus is connected to the CGF apparatus by using a Ga interface. For the charging architecture shown in FIG. 4C, the CGF apparatus is used as an independent network element. In this case, the CHF apparatus is connected to the CGF apparatus by using a Ga interface, and the CGF apparatus is connected to the billing apparatus by using a Bd interface.

Figure 5:
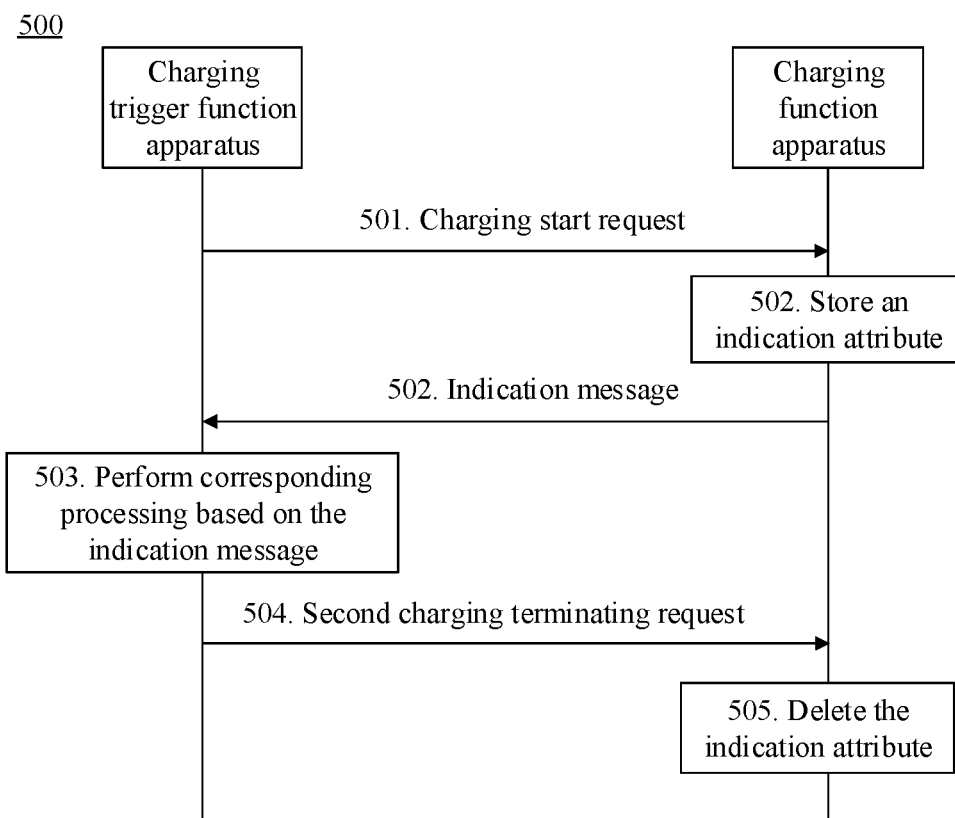
FIG. 5 is a flowchart of a charging method according to an embodiment of this application.

FIG. 5 is a schematic flowchart of a convergent charging method 500 according to this application. The method 500 may be applied to the network architecture shown in FIG. 2, and the charging architectures shown in FIG. 3, and FIG. 4A to FIG. 4C. Certainly, the method 500 may also be applied to another communication scenario. This is not limited in this embodiment of this application. As shown in FIG. 5, the method 500 includes the following content.

Step 501: A CTF apparatus generates a charging start request. The charging start request may be used to request a charging system to create a corresponding charging resource for charging for a current PDU session. The charging start request carries an indication attribute, and the indication attribute may be used by a charging function apparatus to deliver an indication. The indication attribute may be used to trigger the CHF apparatus to send an indication message to the CTF apparatus in a specific condition.

The charging resource herein is a memory applied for by the charging system to perform charging processing on the PDU session, related information (such as user information and package information) read from a peripheral database into the memory, process data (such as a granted quota and accumulated data) that is generated in a charging processing process and that is stored in the memory, and the like.

The CTF apparatus receives a PDU session creation request or a PDU session modification request sent by a front-end network device. Because subsequent steps are the same for the PDU session creation request and the PDU session modification request, the PDU session creation request is used as an example for description in this embodiment of the present invention. Usually, when user equipment needs to perform network communication, for example, a user accesses a data service by using a 5G network, the user equipment sends a PDU session establishment request to an AMF apparatus. The AMF apparatus forwards the PDU session establishment request to an SMF apparatus. The PDU session establishment request carries a PDU session context, such as a user ID and a PDU session ID. The SMF apparatus further obtains user data from a UDM apparatus based on the user ID, and performs authentication with a PCF apparatus and the like based on the user data, to determine whether to authorize the PDU session. After the PDU session is authorized, the CTF apparatus generates a charging start request used for charging.

The CTF apparatus may trigger creation of a charging resource in different cases. For example, when a PDU session starts, charging needs to be started for the PDU session, and the CTF apparatus determines that a charging resource needs to be created. Alternatively, in a PDU session process, when a PDU session needs to be charged for, but there is no available charging resource, the CTF apparatus determines that a charging resource needs to be created.

The CTF apparatus first determines that a charging resource needs to be created, and generates an indication receiving address and a charging start request. The charging start request includes an attribute, and the attribute may be referred to as an indication attribute. The indication attribute may include the indication receiving address, and the indication receiving address is associated with a PDU session whose charging resource is created. The specific PDU session in the CTF apparatus may be uniquely determined by using the indication receiving address. The CHF apparatus may send, by using the indication receiving address, an indication message to the specific PDU session in the CTF apparatus corresponding to the indication receiving address. There may be a plurality of charging types. For example, the charging type may be online charging, offline charging, event-based charging, or converged charging including online charging and offline charging.

The indication attribute may further include an indication ID. The indication ID is used to identify an indication of the charging resource, and the indication ID may be used as a part of the indication receiving address or exist as an independent attribute. The indication attribute may further include an indication type supported by the CTF apparatus. There may be a plurality of indication types: a charging update indication, a charging terminating indication, a CHF apparatus overload indication, a charging rule configuration indication, or a resource validity detecting indication. The charging rule configuration indication may also be referred to as a charging policy configuration indication, for example, an indication of how to configure an address of a candidate CHF apparatus.

The following Table 1 describes a structure of the charging start request by specifically using an example.

TABLE 1

Nchf_UsageCharging_Create_Request:
{
    "smfId": " SMF_XXXX",
    "smfAddress": "XXX.XXX.XXX.XXX",
    "timeStamp": "2018-02-02T08:18.28Z+08:00",
    "chargingid": "XXXX",
    "userInformation": { },
    "pduSessionInformation": { },
    "usagePerRG":[ ],
"notiInfo": {
    "status": "enabled",
      "URI": http://apiRoot/v1/<notiId>,
        "supportedType": "01101"
    }
}

The field "notiInfo" is an indication delivery attribute; the field "URI" is an indication receiving address, where "<notiId>" included in the URI is an indication ID; and supportedType is a list of indication types supported by the CTF apparatus, where bits in "01101" respectively indicate whether a type 1, a type 2, a type 3, a type 4, and a type 5 are supported. The CTF apparatus and the CHF apparatus may agree on an identifier or a sequence number of an indication type in advance, to be specific, each bit represents an indication type. For example, the type 1, the type 2, the type 3, the type 4, and the type 5 are respectively a charging update indication, a charging terminating indication, a CHF apparatus overload indication, a charging rule configuration indication, and a resource validity detecting indication. For each bit, a value "1" indicates that the CTF apparatus supports the type, and "0" indicates that the CTF apparatus does not support the type. For different CTF apparatuses, supported indication types may be different. Therefore, values included in supportedType may also be different. The field "status" is a function state of indication delivery, and the enabled state is used to notify the CHF apparatus that an indication may be delivered by using the URI when a particular condition is met. Alternatively, the status field may not be carried, and only the URI is carried. In this case, the CHF apparatus may deliver an indication by using the URI by default before charging for the PDU session is terminated. In the example in Table 1, the charging start request may further include an ID of an SMF apparatus (namely, the CTF apparatus), an address of the SMF apparatus, a message timestamp, a charging ID, user information, information about the PDU session, and the like.

Step 502: The CHF apparatus receives the charging start request sent by the CTF apparatus, and stores the indication attribute. When a condition is met, the CHF apparatus generates an indication message, and sends the indication message to the CTF apparatus based on the stored indication receiving address.

The CHF apparatus may determine, based on the stored attribute supportType, an indication type that can be sent by the CHF apparatus to the CTF apparatus. On this basis, the CHF apparatus further sends corresponding indication messages to the CTF apparatus based on different conditions, and the indication message includes an indication type. It should be noted that the indication types included in the indication messages are all indication types included in the attribute supportType stored in the CHF apparatus.

Specifically, when a re-authorization condition is met, the CHF apparatus sends an indication message to the CTF apparatus, and the indication message carries an indication type of a charging update indication and an applicable scope. The re-authorization condition herein may be: Re-authorization is required due to a change in a user account balance, re-authorization is required due to a change in user subscription information, re-authorization is required due to a change in a user consumption accumulator, or the like.

When a charging terminating condition is met, the CHF apparatus sends an indication message to the CTF apparatus, and the indication message carries an indication type of a charging terminating indication. The charging terminating condition herein may be: A user account balance is lower than a specified threshold, a credit is used up, or the like.

When the CHF apparatus is overloaded, the CHF apparatus sends an indication message to the CTF apparatus, and the indication message carries an indication type of a CHF apparatus overload indication and an overload degree of the CHF apparatus.

When a charging rule configuration condition is met, the CHF apparatus sends an indication message to the CTF apparatus, and the indication message carries a charging rule configuration indication and a to-be-configured charging rule. The condition herein may be: A charging rule needs to be reconfigured due to a change in configuration information in the charging system, a charging rule needs to be reconfigured due to a change in content subscribed by a user, or the like.

When the charging function apparatus clears an invalid charging resource, the CHF apparatus sends an indication message to the CTF apparatus, and the indication message carries a charging resource validity detecting indication.

The indication types have been described in step 501, and are further described now. Some indication types are mutually exclusive. For example, the charging update indication, the charging terminating indication, and the resource validity detecting indication are mutually exclusive. Some indication types, for example, the charging update indication and the CHF apparatus overload indication, can coexist. One indication message can carry only one of a plurality of mutually exclusive indication types, and one indication message can carry one or more indication types that can coexist. Specifically, an example of a combination of the indication types may be shown in the following Table 2. To be specific, indication types in a same column in Table 2 are mutually exclusive, and indication types in a same row can coexist.

TABLE 2

| Charging update indication | CHF apparatus overload indication |
| | Charging rule configuration indication |
| Charging terminating indication | |
| Resource validity detecting indication | |

The indication message may further include an applicable scope of the indication, and the applicable scope is used to indicate that an operation indicated by the CTF apparatus would take effect within the applicable scope. There are different applicable scopes, for example, all data flows on which online charging is performed in the PDU session, all data flows on which offline charging is performed in the PDU session, or all data flows on which charging is performed in the PDU session. The applicable scope may further be limited to data flows that correspond to one or more rating groups (RG) in the data flows on which online charging is performed, or data flows that correspond to one or more rating groups in the data flows on which offline charging is performed, or data flows that correspond to one or more rating groups and one or more service flow identifiers (Service Id) corresponding to the one or more rating groups in the data flows on which online charging is performed, or data flows that correspond to one or more rating groups and one or more service flow identifiers corresponding to the one or more rating groups in the data flows on which offline charging is performed. If the indication message does not carry any applicable scope, it is considered by default that the indication message is applicable to all the data flows on which charging is performed in the PDU session. The data flow herein may be data traffic generated when a user accesses a data service.

Step 503: After receiving the indication message sent by the CHF apparatus, the CTF apparatus performs corresponding processing based on the indication type carried in the indication message. Processes of processing performed by the CTF apparatus for different indication types are described below in detail.

Scenario 1: The Indication Type is the Charging Update Indication

After receiving the indication message, the CTF apparatus returns a response message to the CHF apparatus. The CTF apparatus further sends, based on the indication applicable scope included in the indication message, a charging update request to the CHF apparatus for corresponding charging information within the applicable scope, and the charging update request carries to-be-updated charging information. After receiving the charging update request, the CHF apparatus updates local charging information based on the to-be-updated charging information. The charging information may be specifically statistics about data flows, for example, 5 MB traffic is used for a rate group 1. Specifically, if the indication applicable scope carried in the indication message is a data flow (which may be denoted as offline, RG 1) corresponding to the rating group 1 (RG 1) in the data flows on which offline charging is performed, the charging update request is sent to the CHF apparatus for the corresponding charging information within the applicable scope, to be specific, charging update is performed on a data flow to which the rating group RG 1 corresponds in the data flows on which offline charging is performed in the PDU session, and the charging update request carries to-be-updated offline charging information corresponding to RG 1. Then, the CHF apparatus updates local charging information of the CHF apparatus based on the to-be-updated offline charging information corresponding to RG 1. If the indication message does not carry the applicable scope, a charging update request is sent to the CHF apparatus for all the data flows on which charging is performed in the PDU session. The charging update request carries charging information of all the data flows on which charging is performed in the PDU session. The CHF apparatus updates local charging information of the CHF apparatus based on the charging information of all the data flows on which charging is performed in the PDU session.

Specifically, the CTF apparatus may send the charging update request (the charging update request may be specifically a charging addition request or a charging replacement request) by using a patch command in a plurality of manners, to update the charging information. Specific manners may be as follows:

Manner 1: The CTF apparatus sends a charging addition request to the CHF apparatus, the charging addition request carries to-be-updated charging information, the to-be-updated charging information is specifically to-be-added charging information, and the charging addition request may be used to request the CHF apparatus to add the to-be-added charging information to previously updated charging information. Specifically, the CHF apparatus stores online charging quota application, online charging quota usage information, or offline charging information as a charging array, the CTF apparatus sends the charging addition request to the CHF apparatus, and the CHF apparatus adds the to-be-added charging information to the stored charging array. Specifically, the charging addition request is a JSON patch request that carries an add operation.

An example of a specific format of the patch command is shown in Table 3:

TABLE 3

PATCH /usagecharging HTTP/2.0
    Content-Type: application/json-patch+json
    If-Match: "etag"
    [
      {"op": "add", "path": "/onlineUsage/X/ratingGroup", "value": "5" },//Perform an add operation on a parameter corresponding to a path in a JSON array, namely, an onlineUsage array, and a value 5 is added.

TABLE 3-continued

{"op": "add", "path": "/onlineUsage/X/rsu/0/unitType", "value": "Octets" }.
{"op": "add", "path": "/onlineUsage/X/rsu/0/unitValue", "value": "50" }
]

Manner 2: The CTF apparatus sends a charging replacement request to the CHF apparatus, the charging replacement request carries to-be-updated charging information, the to-be-updated charging information is specifically currently reported to-be-replaced charging information, and the charging replacement request may be used to request the CHF apparatus to update previous charging information by using the currently reported to-be-replaced charging information. Specifically, the CHF apparatus may store online charging quota application, online charging quota usage information, or offline charging information as a charging array. The CTF apparatus sends the charging replacement request to the CHF apparatus. After receiving the charging replacement request, the CHF apparatus may update an entire array based on the current to-be-replaced charging information, to replace all original online charging quota application, online charging quota usage information, or offline charging information in the charging array with the currently reported to-be-replaced charging information.

Specifically, the charging replacement request is a JSON Merge Patch request. An example is as follows (In this example, onlineUsage corresponds to an online charging quota usage and application array, and offlineUsage corresponds to an offline charging information array). An example of a specific format of the patch command is shown in Table 4:

TABLE 4

PATCH /usagecharging HTTP/2.0
Content-Type: application/merge-patch+json
{
    "onlineUsage" : [
      {
        "ratingGroup" : "0",
        "reportingReason" : [ "QHT" ],
        "usedUnit" : [
          {
            "unitType" : "totalOctets",
            "unitValue" : 1231
          }
        ]
      }
    ],
    "offlineUsage": [
      {
        "upfId" : "XXX",
        "ratingGroup" : "0",
        "serviceId" : "XXX",
        "units" : [
          {
            "unitType" : "totalOctets",
            "unitValue" : 1231
          }
        ],
      }
    ]
}

The CTF apparatus may alternatively perform a replace operation in JSON Patch to replace an original element in a corresponding charging array with a new value. If a quantity of original elements in the corresponding charging array is greater than a quantity of new values, the CTF apparatus performs a remove operation to delete redundant elements;

or if a quantity of original elements in the corresponding charging array is less than a quantity of new values, the CTF apparatus performs an add operation to add an element.

The CTF apparatus may alternatively perform a remove operation in JSON Patch to delete all original elements from a corresponding array, and perform an add operation to add the currently reported content to the corresponding array.

Scenario 2: The Indication Type is the Charging Terminating Indication

After receiving the indication message that carries the indication type of the charging terminating indication, the CTF apparatus returns a response message to the CHF apparatus. Further, the CTF apparatus generates a first charging terminating request.

Specifically, the first charging terminating request carries all current charging information of the PDU session. Alternatively, before sending the first charging terminating request to the CHF apparatus, the CTF apparatus first sends a charging update request to the CHF apparatus, and the charging update request carries all current charging information of the PDU session. Then, the CTF apparatus sends the first charging terminating request to the CHF apparatus, and the first charging terminating request does not carry any charging information. After receiving the first charging terminating request, the CHF apparatus terminates charging for the current PDU session. Such an operation is applicable to the entire PDU session. The first charging terminating request may not carry an applicable scope, or may carry charging information of all the data flows on which charging is performed in the PDU session.

Specifically, the first charging terminating request may be a POST message, a PUT message, or a DELETE message. If the first charging terminating request is a DELETE message, the CHF apparatus directly terminates charging based on the DELETE message. The message does not carry any charging information. However, before sending the DELETE message, the CTF apparatus needs to send the charging update request to the CHF apparatus, and the charging update request carries all the current charging information of the PDU session. The CHF apparatus updates local charging information of the PDU session by using all the current charging information of the PDU session. If the first charging terminating request is a POST message or a PUT message, a message body of the POST message or the PUT message carries a special attribute (for example, TerminationOfCharging) of the charging terminating indication and all charging information of the PDU session. The CHF apparatus receives the POST message or the PUT message. The CHF apparatus updates local charging information of the PDU session based on all the current charging information of the PDU session, and after the charging information of the PDU session is updated, the CHF apparatus determines, based on the attribute of the charging terminating indication, that charging needs to be terminated, and terminates charging for the current PDU session.

Scenario 3: The Indication Type is the CHF Apparatus Overload Indication

After the CTF apparatus receives the indication message, where the indication message further carries an overload degree of the CHF apparatus, the CTF apparatus returns a response message to the CHF apparatus. The CHF apparatus further performs the following operation: adjusting, by the CTF apparatus based on the overload degree of the CHF apparatus that is carried in the indication message, a quantity of requests sent to the CHF apparatus, until a next indication message of this type is received or a validity period carried in the indication message expires. Such an operation is applicable to the entire PDU session, and the indication message may not carry an applicable scope. The overload degree herein may be used to indicate a load degree of the CHF apparatus. For example, if the overload degree of the CHF apparatus is 80%, it means that the CHF apparatus can process only 20% of the requests. For different overload degrees, quantities of requests sent to the CHF apparatus that are adjusted by the CTF apparatus are different.

Scenario 4: The Indication Type is the Charging Rule Configuration Indication After the CTF apparatus receives the indication message, and the indication message further carries a to-be-configured charging rule, the CTF apparatus locally configures (or stores) the charging rule, and returns a response message to the CHF apparatus. The charging rule may include one or more of the following rules: a candidate CHF apparatus address rule, an offline reporting interval rule, an entire idle resource threshold rule (an entire resource idle threshold is used to determine whether to trigger a charging terminating request), an online or offline recording condition rule, an online or offline reporting condition rule, and a rule of using online charging or offline charging for a rating group.

Scenario 5: The Indication Type is the Resource Validity Detecting Indication After receiving the indication message, the CTF apparatus determines, based on the PDU session ID that is carried in the indication message, whether a charging resource of the corresponding PDU session exists. If the charging resource of the corresponding PDU session exists, the CTF apparatus returns a response success message. If the charging resource of the corresponding PDU session does not exist, the CTF apparatus returns a response failure message. When receiving the response failure message, the CHF apparatus determines that the charging resource of the PDU session does not exist, and may clear the nonexistent charging resource related to the PDU session from the CTF apparatus, for example, some data is persistent, and other data is deleted. Such an indication message does not carry an applicable scope and a parameter.

Table 5 is a specific example of the indication message.

TABLE 5

```
Nchf_UsageCharging_Notify_Request:
{
    "timeStamp" : "2018-02-02T08:18:28Z+08:00",
    "userIds" : {
        "idType" : "SUPI",
        "idValue" : "XXX"
    },
    "pduSessionID" : "XXXX",
    "userId" : "XXXX",
    "resourceId" : "XXXX",
    "type" : "update",
    "scope" : {
        "online" : true,
        "offline" : true,
        "relatedRGs" : [
            {
                "ratingGroup" : "XXX",
                "serviceId" : [ "","" ]
            }
```

TABLE 5-continued

```
            ]
        }
    "parameters" : [
        {
                "name" : "XXX",
                "value" : "XXX"
        }
    ]
}
```

The field "type" indicates an indication type, the field "scope" indicates an applicable scope, and the field "parameters" indicates parameters. The indication message further includes a timestamp, a user identifier, a PDU session identifier, a user ID, a charging resource ID, and the like.

Step 504: The CTF apparatus generates a second charging terminating request, and sends the second charging terminating request to the CHF apparatus.

Further, the second charging terminating request carries an attribute of disabling the charging function apparatus from sending an indication by using the indication receiving address, to notify the CHF apparatus that the indication message cannot be subsequently sent to the CTF apparatus by using the indication receiving address. The second charging terminating request further includes the indication receiving address to be canceled or an indication ID.

Table 6 is a specific example of the second charging terminating request:

TABLE 6

```
Nchf_UsageCharging_Release_Request :
}
        "smfId" : "SMF_XXXX",
        "smfAddress" : "XXX.XXX.XXX.XXX",
        "timeStamp" : "2018-02-02T08:18:28Z+08:00",
        "chargingId" : "XXXX",
        "userInformation" : { },
        "pduSessionInformation" : { }.
        "usagePerRG" : [ ],
        "notiInfo" : {
            "status" : "disabled",
            "URI": "http://apiRoot/v1//<Id>"
        }
    }
```

In the message, the field "notiInfo" is an indication attribute; the field "URI" is an indication receiving address, where <Id> is an indication ID; the field "status" is an indication function state, and the field "disabled" is an attribute that instructs to disable the charging function apparatus from sending an indication by using the indication receiving address, to be specific, the CHF apparatus cannot subsequently send the indication message to the CTF apparatus by using the indication receiving address.

Step 505: After receiving the second charging terminating request, the CHF apparatus obtains, based on the indication receiving address or the indication ID, an indication attribute corresponding to the indication receiving address or the indication ID, and deletes the stored indication attribute based on the attribute of disabling the charging function apparatus from sending an indication by using the indication receiving address.

In this embodiment of the present invention, because the charging trigger function apparatus adds the indication receiving address to the charging start request, the charging function apparatus may send, by using the indication receiving address, the indication message to the charging trigger function apparatus corresponding to the indication receiving address. In this way, the charging trigger function apparatus may receive the indication message carrying the indication type. Because there are a plurality of indication types, the charging trigger function apparatus performs corresponding charging processing based on the different indication types. In this way, the charging function apparatus enables, as required, the charging trigger function apparatus to perform some specific operations, to meet a plurality of different charging requirements.

Figure 6:
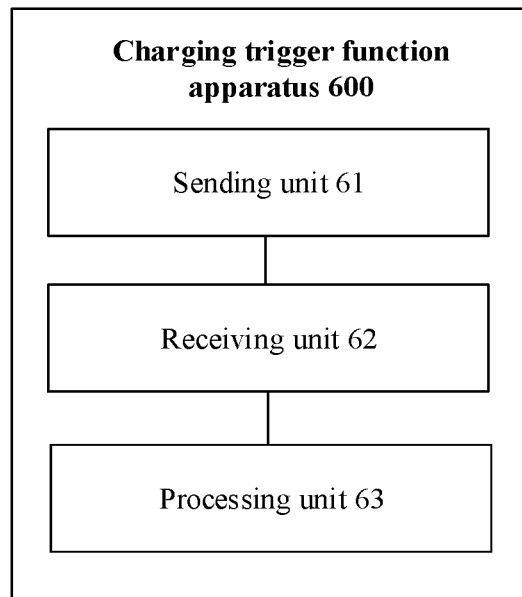
FIG. 6 is a schematic block diagram of a charging trigger function apparatus according to an embodiment of this application.

FIG. 6 is a schematic block diagram of a charging trigger function apparatus 600 according to an embodiment of this application. It should be noted that the charging trigger function apparatus 600 herein may correspond to the CTF apparatus in FIG. 4A to FIG. 4C, and the charging trigger function apparatus 600 may include:

a sending unit 61, configured to send a charging start request for a packet data unit (PDU) session to a charging function apparatus, where the charging start request carries an indication receiving address;

a receiving unit 62, configured to receive an indication message that is sent by the charging function apparatus based on the indication receiving address, where the indication message carries an indication type; and a processing unit 63, configured to perform charging processing based on the indication type.

In a feasible implementation, the processing unit 63 is specifically configured to: when the indication type is specifically a charging update indication, send a charging update request to the charging function apparatus based on the indication type of the charging update indication, where the charging update request carries to-be-updated charging information.

In some feasible implementations, the processing unit 63 is specifically configured to: when the indication message further carries an indication applicable scope, send the charging update request to the charging function apparatus, where the to-be-updated charging information is specifically corresponding charging information within the applicable scope; or when the indication message does not carry an indication applicable scope, send the charging update request to the charging function apparatus, where the to-be-updated charging information is specifically all charging information of the PDU session.

In some feasible implementations, the processing unit 63 is specifically configured to: send a charging addition request to the charging function apparatus, where the charging addition request carries to-be-updated charging information, and the to-be-updated charging information is specifically to-be-added charging information; or send a charging replacement request to the charging function apparatus, where the charging replacement request carries to-be-updated charging information, and the to-be-updated charging information is specifically to-be-replaced charging information.

In a feasible implementation, the processing unit 63 is specifically configured to: when the indication type is specifically a charging terminating indication, send a first charging terminating request to the charging function apparatus based on the indication type of the charging terminating indication, to terminate charging for the PDU session.

In some feasible implementations, the first charging terminating request is specifically a POST message or a PUT message, and the POST message or the PUT message carries an attribute of the charging terminating indication and all current charging information of the PDU session; or the first charging terminating request is specifically a DELETE message, and the processing unit is specifically configured to: before sending the first charging terminating request to the charging function apparatus, send a charging update request to the charging function apparatus, where the charging update request carries all current charging information of the PDU session.

In a feasible implementation, the processing unit 63 is specifically configured to: when the indication type is specifically a charging function apparatus overload indication and the indication message further carries an overload degree of the charging function apparatus, before a next indication message whose indication type is a charging function apparatus overload indication is received or before a validity period carried in the indication message expires, adjust, based on the overload degree, a quantity of requests sent to the charging function apparatus.

In a feasible implementation, the processing unit 63 is specifically configured to: when the indication type is specifically a charging rule configuration indication, and the indication message further carries a charging rule, configure the charging rule based on the indication type of the charging rule configuration indication, where the charging rule includes one or more of the following: a candidate server address rule, an offline reporting interval rule, an entire idle resource threshold rule, an online or offline reporting condition rule, and a rule of using online charging or offline charging for a rating group.

In a feasible implementation, the processing unit 63 is specifically configured to: when the indication type is specifically a charging resource validity detecting indication, determine, based on a PDU session identifier carried in the indication message, that a charging resource of the corresponding PDU session exists; and send a response success message to the charging function apparatus.

In a feasible implementation, the charging start request further carries an attribute of activating the charging function apparatus to deliver an indication by using the indication receiving address. In this case, in a feasible implementation, the sending unit 61 is further configured to send a second charging terminating request to the charging function apparatus, where the second charging terminating request carries an attribute of disabling the charging function apparatus from sending an indication by using the indication receiving address.

In this embodiment of the present invention, because the charging trigger function apparatus adds the indication receiving address to the charging start request, the charging function apparatus may send, by using the indication receiving address, the indication message to the charging trigger function apparatus corresponding to the indication receiving address. In this way, the charging trigger function apparatus may receive the indication message carrying the indication type. Because there are a plurality of indication types, the charging trigger function apparatus performs corresponding charging processing based on the different indication types. In this way, the charging function apparatus enables, as required, the charging trigger function apparatus to perform some specific operations, to meet a plurality of different charging requirements.

Figure 7:
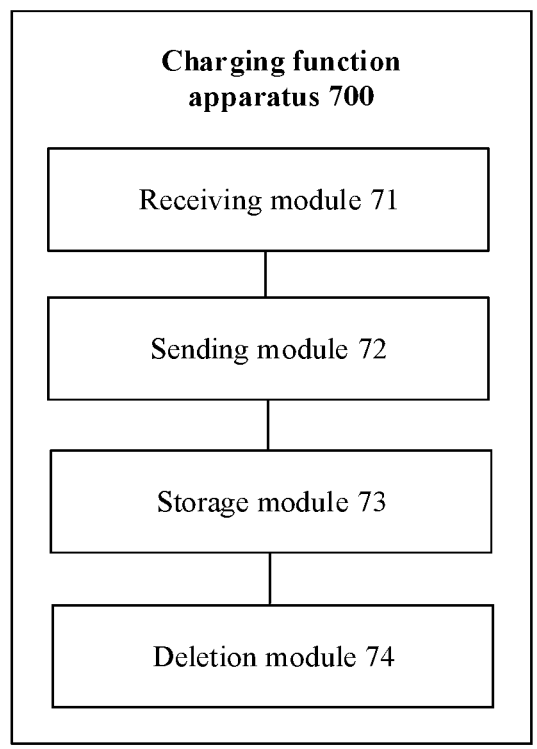
FIG. 7 is a schematic block diagram of a charging function apparatus according to an embodiment of this application.

FIG. 7 is a schematic block diagram of a charging function apparatus 700 according to an embodiment of this application. It should be understood that the charging function apparatus 700 herein may correspond to the CHF in FIG. 4A to FIG. 4C, and the charging function apparatus 700 may include:

a receiving module 71, configured to receive a charging start request sent by a charging trigger function apparatus, where the charging start request carries an indication receiving address; and a sending module 72, configured to send an indication message to the charging trigger function apparatus based on the indication receiving address when it is determined that an indication needs to be sent to the charging trigger function apparatus, where the indication message carries an indication type.

In some possible implementation scenarios, the sending module 72 is specifically configured to: when a re-authentication condition is met, send the indication message to the charging trigger function apparatus based on the indication receiving address, where the indication message carries an indication type of a charging update indication and an indication applicable scope; or when a charging terminating condition is met, send the indication message to the charging trigger function apparatus based on the indication receiving address, where the indication message carries an indication type of a charging terminating indication; or when the charging function apparatus is overloaded, send the indication message to the charging trigger function apparatus based on the indication receiving address, where the indication message carries an indication type of a charging function apparatus overload indication and an overload degree of the charging function apparatus; or when a charging rule configuration condition is met, send the indication message to the charging trigger function apparatus based on the indication receiving address, where the indication message carries an indication type of a charging rule configuration indication and a to-be-configured charging rule; or when the charging function apparatus clears an invalid charging resource, send the indication message to the charging trigger function apparatus based on the indication receiving address, where the indication message carries an indication type of a charging resource validity detecting indication.

In a feasible implementation, the receiving module 71 is specifically configured to: receive a charging update request sent by the charging trigger function apparatus, where the charging update request carries to-be-updated charging information; and update stored charging information with the to-be-updated charging information based on the to-be-updated charging information.

In a feasible implementation, the receiving module 71 is specifically configured to receive a first charging terminating request sent by the charging trigger function apparatus, to terminate charging for the PDU session. In some possible implementations, the first charging terminating request is specifically a POST message or a PUT message, and the POST message or the PUT message carries an attribute of the charging terminating indication and all current charging information of the PDU session; and the receiving module 71 is specifically configured to: update charging information of the PDU session based on all the current charging information of the PDU session; and terminate charging for the PDU session based on the attribute of the charging terminating indication. Alternatively, the first charging terminating request is specifically a DELETE message, and the receiving module 71 is specifically configured to: before receiving the DELETE message, receive the charging update request sent by the charging trigger function apparatus, where the charging update request carries all current charging information of the PDU session; update charging information of the PDU session; and terminate charging for the PDU session based on the DELETE message.

In a feasible implementation, the charging function apparatus further includes a storage module 73, configured to store the indication receiving address after the charging start request sent by the charging trigger function apparatus is received.

In a feasible implementation, the receiving module 71 is specifically configured to receive a second charging terminating request sent by the charging trigger function apparatus, where the second charging terminating request carries an attribute of disabling the charging function apparatus from sending an indication by using the indication receiving address; and the charging function apparatus further includes a deletion module 74, configured to delete the indication receiving address based on the attribute of disabling the charging function apparatus from sending an indication by using the indication receiving address.

Figure 8:
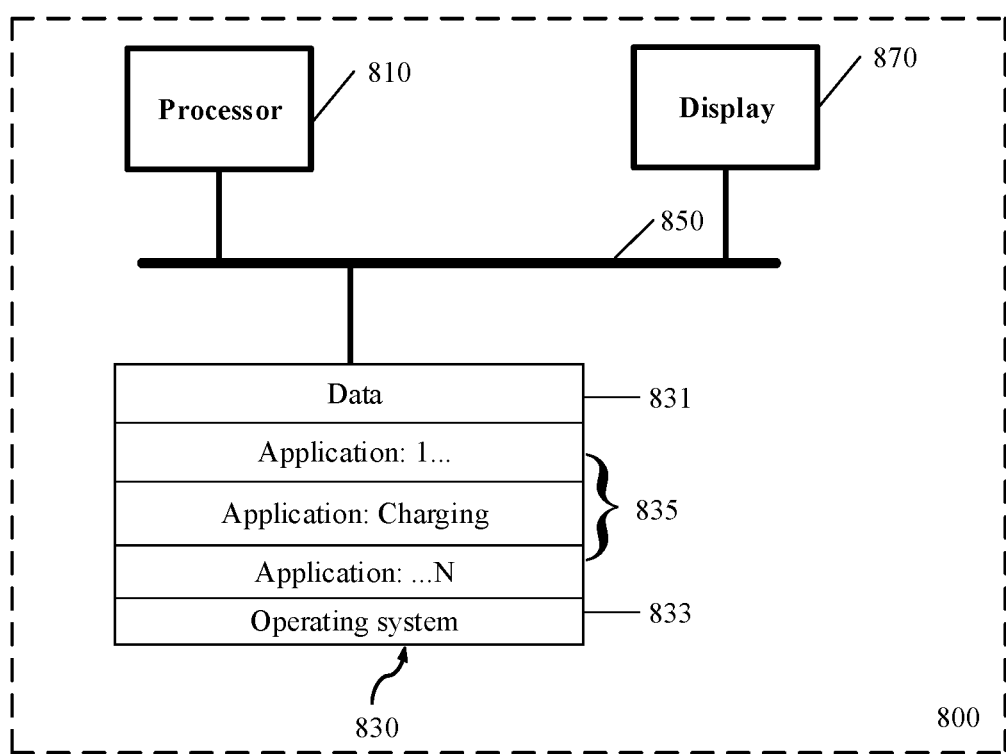
FIG. 8 is a schematic block diagram of a charging device according to an embodiment of this application.

FIG. 8 is a schematic block diagram of an implementation of a charging trigger function apparatus or a charging function apparatus (which may be referred to as a charging device 800 for short herein) according to an embodiment of this application. The charging device 800 may include a processor 810, a memory 830, and a bus system 850. The processor and the memory are connected by using the bus system. The memory is configured to store an instruction. The processor is configured to execute the instruction stored in the memory. The memory of the charging device stores program code, and the processor may invoke the program code stored in the memory to perform various charging processing methods described in this application, for example, the processing steps described in the embodiment in FIG. 5. To avoid repetition, details are not described herein again.

In this embodiment of this application, the processor 810 may be a central processing unit ("CPU" for short), or the processor 810 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 830 may include a read-only memory (ROM) device or a random-access memory (RAM) device. Any other proper type of storage device may be alternatively used as the memory 830. The memory 830 may include code and data 831 accessed by the processor 810 by using the bus system 850. The memory 830 may further include an operating system 833 and an application program 835. The application program 835 includes at least one program that allows the processor 810 to perform the charging method described in this application. For example, the application program 835 may include applications 1 to N, and further include a charging application that performs the charging method described in this application.

In addition to a data bus, the bus system 850 may further include a power bus, a control bus, a status signal bus, and the like. However, for clarity of description, various types of buses in the figure are marked as the bus system 850.

Optionally, the charging device 800 may further include one or more output devices, for example, a display 870. In an example, the display 870 may be a touch display that combines a display and a touch unit that operably senses touch input. The display 870 may be connected to the processor 810 by using the bus system 850.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the various illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communication medium including any medium that facilitates transfer (for example, according to a communications protocol) of a computer program from one place to another. In this manner, the computer-readable medium may generally correspond to (1) a non-transitory tangible computer-readable storage medium or (2) a communication medium such as a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example, and not limitation, such computer-readable storage media may include a RAM, a ROM, an EEPROM, a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection is appropriately referred to as a computer-readable medium. For example, if an instruction is transmitted from a website, server, or another remote source through a coaxial cable, a fiber-optic cable, a twisted pair, a digital subscriber line (DSL), or wireless technologies such as infrared, radio, and microwave, the coaxial cable, optical fiber, twisted pair, DSL, or the wireless technologies such as infrared, radio, and microwave are included in the definition of medium. However, it should be understood that the computer-readable storage medium and the data storage medium do not include connections, carriers, signals, or other transitory media, but actually means non-transitory tangible storage media. Disks and discs used in this specification include a compact disc (CD), a laser disc, an optical disc, a digital versatile disc (DVD), and a Blu-ray disc. The disks usually reproduce data magnetically, while the discs reproduce data optically with lasers. Combinations of the foregoing should also be included within the scope of the computer-readable medium.

An instruction may be executed by one or more processors such as one or more digital signal processors (DSP), a general microprocessor, an application-specific integrated circuit (ASIC), a field programmable gate array (FPGA), or other equivalent integrated circuits or discrete logic circuits. Therefore, the term "processor" used in this specification may refer to the foregoing structure, or any other structure that may be applied to implementation of the technologies described in this specification. In addition, in some aspects, the functions described with reference to the various illustrative logical blocks, modules, and steps described in this specification may be provided within dedicated hardware and/or software modules configured for charging or may be incorporated into a charging device. In addition, the technologies may be implemented in one or more circuits or logic elements.

The technologies of this application may be implemented in various apparatuses or devices, including a wireless handset, an integrated circuit (IC), or a group of ICs (for example, a chip group). Various components, modules, or units described in this application are intended to emphasize functional aspects of an apparatus configured to perform the disclosed technologies, but do not necessarily need to be implemented by different hardware units. Actually, as described above, the various units may be combined with suitable software and/or firmware in a codec hardware unit or provided by an interoperable hardware unit (including one or more processors as described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A charging method, comprising:
    sending, via a service-based interface, by a charging trigger function apparatus to a charging function apparatus that performs online charging or offline charging, a charging create request to request creating a charging resource for a data session between a user equipment and a user plane function entity, wherein the charging create request carries a receiving address that is associated with the data session between the user equipment and the user plane function entity;
    receiving, via the service-based interface and by the charging trigger function apparatus, a notification message from the charging function apparatus, wherein the notification message carries the receiving address and an indication type indicating a type of charging processing performed by the charging trigger function apparatus; and
    performing, by the charging trigger function apparatus, the charging processing for the data session based on the indication type in the notification message from the charging function apparatus.

2. The method according to claim 1, wherein when the indication type is a charging update indication, the performing the charging processing based on the indication type comprises:
    sending, in response to the notification message carrying the charging update indication, a charging update request to the charging function apparatus, wherein the charging update request carries to-be-updated charging information.

3. The method according to claim 2, wherein when the notification message further carries an indication applicable scope, the to-be-updated charging information is corresponding charging information within the indication applicable scope; or
    when the notification message does not carry an indication applicable scope, the to-be-updated charging information is all charging information of the data session.

4. The method according to claim 2, wherein the sending, in response to the notification message carrying the charging update indication, the charging update request to the charging function apparatus comprises:
    sending, in response to the notification message carrying the charging update indication, a charging addition request to the charging function apparatus, wherein the charging addition request carries to-be-updated charging information, and the to-be-updated charging information is to-be-added charging information.

5. The method according to claim 2, wherein the sending, in response to the notification message carrying the charging update indication, the charging update request to the charging function apparatus comprises:
    sending, in response to the notification message carrying the charging update indication, a charging replacement request to the charging function apparatus, wherein the charging replacement request carries to-be-updated charging information, and the to-be-updated charging information is to-be-replaced charging information.

6. The method according to claim 1, wherein when the indication type is a charging terminating indication, the performing the charging processing based on the indication type comprises:
    sending, in response to the notification message carrying the charging terminating indication, a first charging terminating request to the charging function apparatus based on the indication type of the charging terminating indication, to terminate charging for the data session.

7. The method according to claim 1, wherein when the indication type is a charging function apparatus overload indication, the notification message further carries an overload degree of the charging function apparatus, and the performing the charging processing for the data session based on the indication type comprises:
    before a next notification message whose indication type is a charging function apparatus overload indication is received or before a validity period carried in the notification message expires, adjusting, based on the overload degree, a quantity of requests sent to the charging function apparatus.

8. The method according to claim 1, wherein when the indication type is a charging rule configuration indication, the notification message further carries a charging rule, and the performing the charging processing based on the indication type comprises:
    configuring the charging rule based on the indication type of the charging rule configuration indication, wherein the charging rule comprises one or more of the following: a candidate server address rule, an offline reporting interval rule, an entire idle resource threshold rule, an online or offline reporting condition rule, or a rule of using online charging or offline charging for a rating group.

9. The method according to claim 1, wherein when the indication type is a charging resource validity detecting indication, the performing the charging processing based on the indication type comprises:
    determining, based on a data session identifier carried in the notification message, that a charging resource of a corresponding data session exists; and sending a response success message to the charging function apparatus.

10. A charging method, comprising:
    receiving, from a charging trigger function apparatus, via a service-based interface, by a charging function apparatus that performs online charging or offline charging, a charging create request that requests to create a charging resource for a data session between a user equipment and a user plane function entity, wherein the charging create request from the charging trigger function apparatus carries a receiving address that is associated with the data session between the user equipment and the user plane function entity;

determining, by the charging function apparatus, to send a notification message to the charging trigger function apparatus for performing charging processing for the data session; and sending, in response to the determining, via the service-based interface and by the charging function apparatus, the notification message to the charging trigger function apparatus based on the receiving address associated with the data session, wherein the notification message carries the receiving address and an indication type indicating a type of the charging processing performed by the charging trigger function apparatus.

11. The method according to claim 10, wherein the determining to send the notification message to the charging trigger function apparatus, and the sending the notification message to the charging trigger function apparatus based on the receiving address associated with the data session comprises:

determining a re-authentication condition is met, and sending the notification message to the charging trigger function apparatus based on the receiving address associated with the data session, wherein the notification message carries an indication type of a charging update indication and an indication applicable scope.

12. The method according to claim 10, wherein the determining to send the notification message to the charging trigger function apparatus, and the sending the notification message to the charging trigger function apparatus based on the receiving address associated with the data session comprises:

determining, by the charging function apparatus that performs online charging or offline charging, a charging terminating condition is met; and sending, in response to the determining, the notification message to the charging trigger function apparatus based on the receiving address, wherein the notification message carries an indication type of a charging terminating indication.

13. The method according to claim 10, wherein the determining to send the notification message to the charging trigger function apparatus, and the sending in response to the determining, the notification message to the charging trigger function apparatus based on the receiving address comprises:

determining, by the charging function apparatus that performs online charging or offline charging, a charging function apparatus is overloaded; and sending, in response to the determining, by the charging function apparatus that performs online charging or offline charging, the notification message to the charging trigger function apparatus based on the receiving address, wherein the notification message carries an indication type of a charging function apparatus overload indication and an overload degree of the charging function apparatus.

14. The method according to claim 13, wherein the determining to send the notification message to the charging trigger function apparatus, and the sending in response to the determining, the notification message to the charging trigger function apparatus based on the receiving address comprises:

determining, by the charging function apparatus that performs online charging or offline charging, a charging rule configuration condition is met; and sending, in response to the determining, by the charging function apparatus that performs online charging or offline charging, the notification message to the charging trigger function apparatus based on the receiving address, wherein the notification message carries an indication type of a charging rule configuration indication and a to-be-configured charging rule.

15. The method according to claim 10, wherein the determining to send the notification message to the charging trigger function apparatus, and the sending in response to the determining, the notification message to the charging trigger function apparatus based on the receiving address comprises:

determining, by the charging function apparatus that performs online charging or offline charging, a charging function apparatus clears an invalid charging resource; and sending, in response to the determining, by the charging function apparatus that performs online charging or offline charging, the notification message to the charging trigger function apparatus based on the receiving address, wherein the notification message carries an indication type of a charging resource validity detecting indication.

16. The method according to claim 10, wherein the method further comprises:

receiving a charging update request from the charging trigger function apparatus, wherein the charging update request carries to-be-updated charging information; and updating stored charging information with the to-be-updated charging information based on the to-be-updated charging information.

17. A charging method, comprising:

sending, via a service-based interface by a charging trigger function apparatus to a charging function apparatus that performs online charging or offline charging, a charging create request to request creating a charging resource for a data session between a user equipment and a user plane function entity, wherein the charging create request sent to the charging function apparatus that performs online charging or offline charging carries a receiving address that is associated with the data session between the user equipment and the user plane function entity;

determining, by the charging function apparatus, to send a notification message to the charging trigger function apparatus for performing charging processing;

receiving, via the service-based interface by the charging trigger function apparatus, the notification message from the charging function apparatus, wherein the notification message carries the receiving address and an indication type indicating a type of charging processing performed by the charging trigger function apparatus; and performing, by the charging trigger function apparatus, the charging processing based on the indication type in the notification message from the charging function apparatus.

18. The charging method according to claim 17, wherein when the indication type is a charging update indication, the performing the charging processing based on the indication type comprises:

sending, via the service-based interface by the charging trigger function apparatus, a charging update request to the charging function apparatus based on the indication type of the charging update indication, wherein the charging update request carries to-be-updated charging information.

19. A charging function apparatus, including at least one processor that is coupled with a nonvolatile memory, where the at least one processor invokes program code stored in the memory to perform following operations:
- receiving from a charging trigger function apparatus, via a service-based interface, a charging create request that requests to create a charging resource for a data session between a user equipment and a user plane function entity, wherein the charging create request from the charging trigger function apparatus carries a receiving address that is associated with the data session between the user equipment and the user plane function entity;
- determining to send a notification message to the charging trigger function apparatus for performing charging processing for the data session; and
- sending, in response to the determining, via the service-based interface, the notification message to the charging trigger function apparatus based on the receiving address associated with the data session, wherein the notification message carries the receiving address and an indication type indicating a type of the charging processing performed by the charging trigger function apparatus.

20. The charging function apparatus according to claim 19, wherein when the indication type is a charging update indication, and wherein—the operations further comprise:
- receiving a charging update request from the charging trigger function apparatus, wherein the charging update request is sent based on the indication type of the charging update indication and carries to-be-updated charging information.

21. A charging trigger function apparatus, including at least one processor that is coupled with a nonvolatile memory, where the at least one processor invokes program code stored in the memory to perform following operations:
- sending, via a service-based interface to a charging function apparatus that performs online charging or offline charging, a charging create request to request creating a charging resource for a data session between a user equipment and a user plane function entity, wherein the charging create request carries a receiving address that is associated with the data session between the user equipment and the user plane function entity;
- receiving, via the service-based interface, a notification message from the charging function apparatus, wherein the notification message carries the receiving address and an indication type indicating a type of charging processing performed by the charging trigger function apparatus; and
- performing, the charging processing for the data session based on the indication type in the notification message from the charging function apparatus.

22. The charging trigger function apparatus according to claim 21, wherein when the indication type is a charging update indication, the performing charging processing based on the indication type comprises:
- sending, in response to the notification message carrying the charging update indication, a charging update request to the charging function apparatus, wherein the charging update request carries to-be-updated charging information.

23. The charging trigger function apparatus according to claim 21, wherein when the indication type is a charging terminating indication, the performing charging processing based on the indication type comprises:
- sending, in response to the notification message carrying the charging terminating indication, a first charging terminating request to the charging function apparatus based on the indication type of the charging terminating indication, to terminate charging for the data session.

24. A charging system, comprising a charging trigger function apparatus and a charging function apparatus, wherein
the charging trigger function apparatus is configured to:
- sending, via a service-based interface to a charging function apparatus that performs online charging or offline charging, a charging create request to request creating a charging resource for a data session between a user equipment and a user plane function entity, wherein the charging create request carries a receiving address that is associated with the data session between a user equipment and a user plane function entity;
- receiving, via the service-based interface, a notification message from the charging function apparatus, wherein the notification message carries the receiving address that is associated with the data session and an indication type indicating a type of charging processing performed by the charging trigger function apparatus;
- performing, the charging processing for the data session based on the indication type in the notification message from the charging function apparatus; and the charging function apparatus is configured to:
- receive the charging create request for the data session; and
- send the notification message to the charging trigger function apparatus based on the receiving address associated with the data session between a user equipment and a user plane function entity.

* * * * *